(12) United States Patent
Rush et al.

(10) Patent No.: US 7,778,674 B2
(45) Date of Patent: Aug. 17, 2010

(54) COMMUNICATION APPARATUS HAVING A SIM INTERFACE COMPATIBLE WITH RADIO ISOLATION

(75) Inventors: Frederick A. Rush, Austin, TX (US); Satish S. Kulkarni, Austin, TX (US)

(73) Assignee: ST-Ericsson SA, Geneva (CH)

( * ) Notice: Subject to any disclaimer, the term of this patent is extended or adjusted under 35 U.S.C. 154(b) by 1093 days.

(21) Appl. No.: 11/025,673

(22) Filed: Dec. 29, 2004

(65) Prior Publication Data

US 2006/0142064 A1 Jun. 29, 2006

(51) Int. Cl.
*H04M 1/00* (2006.01)
(52) U.S. Cl. .................... 455/574; 455/556.1; 455/558; 713/300; 710/13
(58) Field of Classification Search ............... 455/296, 455/310, 63.1, 574, 552.1, 556.1, 558, 572, 455/414.1, 415; 327/295, 296, 291; 713/300; 710/13; 345/539
See application file for complete search history.

(56) References Cited

U.S. PATENT DOCUMENTS

| | | | |
|---|---|---|---|
| 4,384,361 A | 5/1983 | Masaki | |
| 4,805,165 A | 2/1989 | Kawamura et al. | |
| 4,870,699 A | 9/1989 | Garner et al. | |
| 4,879,758 A | 11/1989 | DeLuca et al. | |
| 4,930,126 A | 5/1990 | Kazecki et al. | |
| 4,996,639 A | 2/1991 | Ishimoto et al. | |
| 5,031,233 A | 7/1991 | Ragan | |
| 5,058,203 A | 10/1991 | Inagami | |
| 5,142,699 A | 8/1992 | Sato et al. | |

(Continued)

FOREIGN PATENT DOCUMENTS

EP 0447302 A1 9/1991

(Continued)

OTHER PUBLICATIONS

Notification of Transmittal of the International Search Report and the Written Opinion of the International Searching Authority or the Declaration, International Application No. PCT/US2005/047387, Dec. 28, 2005.

(Continued)

*Primary Examiner*—Duc Nguyen
*Assistant Examiner*—Dominic E Rego
(74) *Attorney, Agent, or Firm*—William J. Kubida; Scott J. Hawranek; Hogan Lovells US LLP

(57) ABSTRACT

A communication apparatus including a radio frequency (RF) circuit coupled to a digital processing circuit and an interface circuit coupled to an authentication device. The RF circuit may be configured to operate on a radio frequency signal. A portion of the digital processing circuit may be disabled during an active mode of operation of the RF circuit. The interface circuit may be configured to buffer data communicated between the digital processing circuit and an authentication device during the active mode of operation of the RF circuit. In one embodiment, the interface circuit includes a memory and memory control logic to buffer data available for transmission to and/or received from the authentication device. In some embodiments, the digital processing circuit includes a processing unit configured to process authentication data received from the authentication device. In these and other embodiments, the authentication device may be a subscriber identity module (SIM).

24 Claims, 6 Drawing Sheets

U.S. PATENT DOCUMENTS

| | | | |
|---|---|---|---|
| 5,150,361 | A | 9/1992 | Wieczorek et al. |
| 5,151,769 | A | 9/1992 | Immorlica, Jr. et al. |
| 5,241,541 | A | 8/1993 | Farrell et al. |
| 5,280,644 | A | 1/1994 | Vannatta et al. |
| 5,307,066 | A | 4/1994 | Kobayashi et al. |
| 5,355,524 | A | 10/1994 | Higgins, Jr. |
| 5,448,755 | A | 9/1995 | Tanaka |
| 5,471,471 | A | 11/1995 | Freeburg et al. |
| 5,471,663 | A | 11/1995 | Davis |
| 5,475,684 | A | 12/1995 | Shimizu |
| 5,519,711 | A | 5/1996 | Sointula |
| 5,604,928 | A | 2/1997 | Hamano et al. |
| 5,630,224 | A | 5/1997 | Swail |
| 5,649,160 | A | 7/1997 | Corry et al. |
| 5,717,948 | A * | 2/1998 | Michalina ................ 710/1 |
| 5,758,278 | A | 5/1998 | Lansdowne |
| 5,764,693 | A | 6/1998 | Taylor et al. |
| 5,812,936 | A | 9/1998 | DeMont |
| 5,838,741 | A | 11/1998 | Callaway, Jr. et al. |
| 5,842,037 | A | 11/1998 | Haartsen |
| 5,872,540 | A | 2/1999 | Casabona et al. |
| 5,875,449 | A | 2/1999 | Ono |
| 5,917,854 | A | 6/1999 | Taylor et al. |
| 5,920,592 | A | 7/1999 | Tanaka et al. |
| 5,923,761 | A | 7/1999 | Lodenius |
| 5,953,640 | A | 9/1999 | Meador et al. |
| 6,020,614 | A | 2/2000 | Worley |
| 6,243,597 | B1 | 6/2001 | Daanen |
| 6,246,335 | B1 | 6/2001 | Tsunoda |
| 6,356,753 | B1 * | 3/2002 | Kolev et al. ............... 455/411 |
| 6,366,622 | B1 | 4/2002 | Brown et al. |
| 6,405,049 | B2 | 6/2002 | Herrod et al. |
| 6,480,553 | B1 | 11/2002 | Ho et al. |
| 6,498,819 | B1 | 12/2002 | Martin |
| 6,510,185 | B2 | 1/2003 | Lee et al. |
| 6,850,879 | B1 * | 2/2005 | Iga ................................ 703/19 |
| 6,944,688 | B1 * | 9/2005 | Batcher ........................ 710/55 |
| 6,987,948 | B2 * | 1/2006 | Engstrom et al. .......... 455/41.1 |
| 7,406,334 | B2 * | 7/2008 | Liu .............................. 455/558 |
| 2002/0080728 | A1 | 6/2002 | Sugar et al. |
| 2003/0020521 | A1 | 1/2003 | Lee et al. |
| 2003/0114152 | A1 * | 6/2003 | Gibbs et al. ................. 455/419 |
| 2003/0167329 | A1 * | 9/2003 | Kurakake et al. ........... 709/226 |
| 2004/0087351 | A1 * | 5/2004 | Paver et al. .................. 455/574 |
| 2004/0157584 | A1 * | 8/2004 | Bensimon et al. ........... 455/411 |
| 2005/0141460 | A9 * | 6/2005 | Currivan et al. ............. 370/335 |
| 2005/0153740 | A1 * | 7/2005 | Binzel et al. ................. 455/558 |
| 2005/0268129 | A1 | 12/2005 | Julicher et al. |
| 2006/0003724 | A1 * | 1/2006 | Karr ............................. 455/296 |
| 2006/0128376 | A1 | 6/2006 | Alexis |

FOREIGN PATENT DOCUMENTS

| | | |
|---|---|---|
| EP | 0447302 B1 | 9/1991 |
| EP | 0 939 495 | 9/1999 |
| EP | 00463621 A1 | 1/2000 |
| EP | 00463621 B1 | 1/2000 |
| WO | 01/39406 | 5/2001 |

OTHER PUBLICATIONS

International Search Report, International Application No. PCT/US2005/047387, Dec. 28, 2005.

Written Opinion of the International Searching Authority, International Application No. PCT/US2005/047387, Dec. 28, 2005.

U.S. Appl. No. 10/426,042, filed Apr. 29, 2003, Sooch et al.

Office Action for PRC Patent Application No. 200580048800.X based on PCT/US2005/047387, Communication Apparatus Having A SIM Interface Compatible With Radio Isolation, pp. 4.

English Translation of Office Action for PRC Patent Application No. 200580048800.X based on PCT/US2005/047387, Communication Apparatus Having A SIM Interface Compatible With Radio Isolation, pp. 2.

Office Action for Chinese Application No. 200580048800.X mailing date Apr. 10, 2009, pp. 7.

Partial Translation of Office Action for Chinese Application No. 200580048800.X mailing date Apr. 10, 2009, pp. 3.

* cited by examiner

COMMUNICATION APPARATUS HAVING A SIM INTERFACE COMPATIBLE WITH RADIO ISOLATION

BACKGROUND OF THE INVENTION

1. Field of the Invention

This invention relates generally to communication apparatus including radio frequency (RF) circuits and, more particularly, to interfaces within communication apparatus that accommodate communication with authentication devices.

2. Description of the Related Art

High performance wireless communication apparatus such as RF receivers, transmitters, and transceivers typically include RF front-end circuitry that operates on an RF signal being received or transmitted. For example, the front-end circuitry may down-convert a received RF signal to baseband and/or up-convert a baseband signal for RF transmission.

The RF front-end circuitry typically includes analog circuits such as low noise amplifiers and mixers that have a relatively high sensitivity to noise and interference. The RF circuitry in some applications, such as in mobile communication cellular 20 handsets, may be required to detect signals as small as a few micro-volts or less in amplitude. It is thus often important to minimize noise and interference from sources external or even internal to the communication apparatus.

In addition to the RF front-end circuitry, typical wireless communication 25 apparatus may also include digital processing circuitry that performs various digital functions including, for example, low level baseband signal processing, implementation of the communication protocol stack, and various user interface functionality. The digital processing circuitry may include a variety of specific hardware such as a DSP (digital signal processor), an MCU (microcontroller unit), hardware accelerators, memory, and/or I/O interfaces, among numerous other specific hardware devices.

Unfortunately, the digital processing circuitry of a typical communication apparatus can be a significant source of detrimental noise and interference. More particularly, the digital processing circuitry in a typical high performance communication apparatus produces digital signals with relatively small rise and fall times, or with fast transitions or sharp edges. Furthermore, those signals often have relatively high frequencies. As a result, their Fourier series or transforms have rich harmonic contents. The harmonics, or higher-frequency Fourier series components, cause spurious emissions that may interfere with, and may adversely impact, the performance of the RF front-end circuitry. Thus, in many systems, the RF front-end circuitry is implemented on an integrated circuit die that is separate from the integrated circuit die on which the digital processing circuitry is implemented. Additionally, the RF front-end circuitry and digital processing circuitry are often placed in separate electrical cavities, where the shielding of the cavities helps to isolate the electrical and magnetic coupling.

Implementing the RF front-end circuitry and the digital processing circuitry on separate dies, however, has several disadvantages, such as increased component count, size, and overall cost, and more potential for decreased reliability and increased manufacturing failures. It is thus desirable to allow integration of the RF front-end circuitry and digital processing circuitry on a single integrated circuit die without significant degradation of performance due to interference.

In addition to the foregoing design considerations, it is typical for a communication apparatus to include an authentication device that securely stores user-specific data. For example, GSM/GPRS and 3G mobile phones may use an authentication device specified by GSM 11.11 or subsequent specifications called a subscriber identity module (SIM). A SIM is a version of a smart card that includes a processor and memory protected by an encryption mechanism. The standard interface for smart cards, specified in ISO 7816-3, includes a requirement that the communication apparatus deliver a constant rate clock to the authentication device during a period of communication that may last for several seconds, depending on the specific implementation of the authentication device.

SUMMARY OF THE INVENTION

Various embodiments of a communication apparatus (e.g., a mobile phone) are disclosed. In one embodiment, the communication apparatus includes a radio frequency (RF) circuit coupled to a digital processing circuit and an interface circuit coupled to an authentication device. The RF circuit may be configured to operate on a radio frequency signal. A portion of the digital processing circuit may be disabled during an active mode of operation of the RF circuit. The interface circuit may be configured to buffer data communicated between the digital processing circuit and an authentication device during the active mode of operation of the RF circuit. In one embodiment, the interface circuit includes a memory and memory control logic to buffer data available for transmission to and/or received from the authentication device.

In some embodiments, the digital processing circuit includes a processing unit configured to process authentication data received from the authentication device. In these and other embodiments, the authentication device may be a subscriber identity module (SIM).

Figure 1:
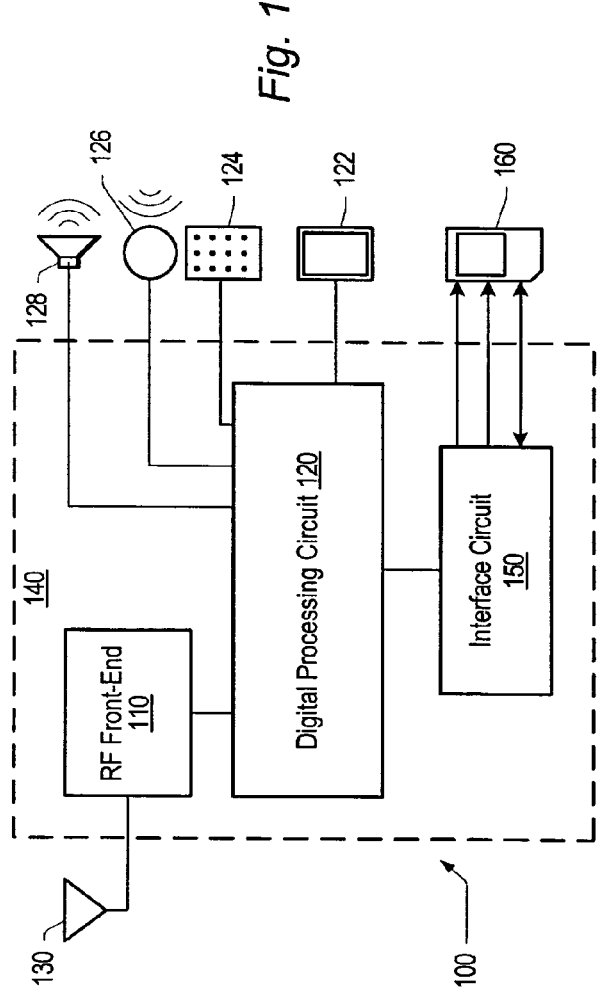
FIG. 1 illustrates a generalized block diagram of a communication apparatus including an RF front-end circuit and a digital processing circuit.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates a generalized block diagram of a communication apparatus 100 including an RF front-end circuit 110 coupled to a digital processing circuit 120. As shown, various user interfaces including a display 122, a keypad 124, a microphone 126, and a speaker 128 may be coupled to digital processing circuit 120, depending upon the specific application of communication apparatus 100 and its desired functionality. An antenna 130 is also shown coupled to RF front-end circuit 110. It is noted that in various embodiments, communication apparatus 100 may include additional components and/or couplings not shown in FIG. 1 and/or exclude one or more of the illustrated components, depending on the desired functionality.

Communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, satellite communications, and the like. As such, communication apparatus 100 may provide RF reception functionality, RF transmission functionality, or both (i.e., RF transceiver functionality).

Communication apparatus 100 may be configured to implement one or more specific communication protocols or standards, as desired. For example, in various embodiments communication apparatus 100 may implement a time-division multiple access (TDMA) standard such as the Global System for Mobile Communications (GSM) standard, the Personal Communications Service (PCS) standard, the Digital Cellular System (DCS) standard, the General Packet Radio Service (GPRS) standard, and/or the Enhanced General Packet Radio Service standard (E-GPRS), which may also be referred to as the Enhanced Data for GSM Evolution (EDGE) standard, among others.

RF front-end circuit 110 may accordingly include circuitry to provide the RF reception capability and/or RF transmission capability. In one embodiment, front-end circuit 110 may down-convert a received RF signal to baseband and/or up-convert a baseband signal for RF transmission. RF front-end circuit 110 may employ any of a variety of architectures and circuit configurations, such as, for example, low-IF receiver circuitry, direct-conversion receiver circuitry, direct up-conversion transmitter circuitry, and/or offset-phase locked loop (OPLL) transmitter circuitry, as desired. RF front-end circuit 110 may additionally employ a low noise amplifier (LNA) for amplifying an RF signal received at antenna 130 and/or a power amplifier for amplifying a signal to be transmitted from antenna 130. In alternative embodiments, the power amplifier may be provided external to RF front-end circuit 110.

Digital processing circuit 120 may provide a variety of signal processing functions, as desired, including baseband functionality. For example, digital processing circuit 120 may be configured to perform filtering, decimation, modulation, demodulation, coding, decoding, correlation and/or signal scaling. In addition, digital processing circuit 120 may perform other digital processing functions, such as implementation of the communication protocol stack, control of audio testing, and/or control of user I/O operations and applications. To perform such functionality, digital processing circuit 120 may include various specific circuitry, such as a software programmable MCU and/or DSP, as well as a variety of specific peripheral circuits such as memory controllers, direct memory access (DMA) controllers, hardware accelerators, voice coder-decoders (CODECs), digital audio interfaces (DAI), UARTs (universal asynchronous receiver transmitters), and user interface circuitry. The choice of digital processing hardware (and firmware/software, if included) depends on the design and performance specifications for a given desired implementation, and may vary from embodiment to embodiment.

As shown, communication apparatus 100 also includes an interface circuit 150. Interface circuit 150 is provided to accommodate communication with an authentication device 160. Further details regarding implementations of interface circuit 150 and authentication device 160 will be provided below.

Figure 2:
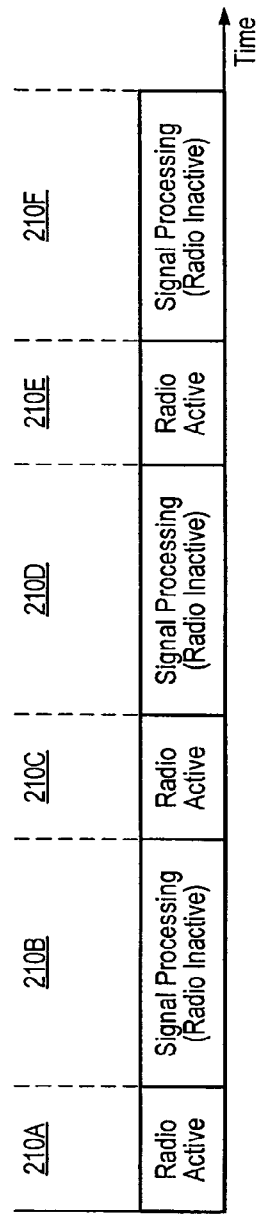
FIG. 2 illustrates a set of events that occur in a communication apparatus according to time domain isolation.

In one embodiment, RF front-end circuit 110, digital processing circuit 120, and interface circuit 150 may be integrated on the same integrated circuit die 140. To reduce interference and thus accommodate high performance functionality, communication apparatus 100 may implement a technique referred to as time domain isolation, or TDI. FIG. 2 illustrates a set of events that occur in communication apparatus 100 according to time domain isolation. Broadly speaking, two alternative events take place in such a system: RF reception or transmission, and signal processing. The system arranges in time the RF reception or transmission activities and the signal processing activities so as to avoid or reduce interference between the RF front-end circuit 110 and the digital processing circuit 120. As described below, interface circuit 150 may be configured to buffer communication between digital processing circuit 120 and authentication device 160 during periods of RF reception or transmission.

As shown in FIG. 2, communication apparatus 100 employs a plurality of timeslots 210A-210F, and so on. During RF timeslots 210A, 210C and 210E, RF front-end circuit 110 may receive RF signals, process the received signals, and store the results. Subsequently, during signal processing timeslots 210B, 210D and 210F, respectively, digital processing circuit 120 may perform signal processing tasks on the stored results.

Alternatively, during RF timeslots 210A, 210C, and 210E, RF front-end circuit 110 may transmit RF signals. Thus, in this mode of operation, during signal processing timeslots 210B and 210D, digital processing circuit 120 performs signal processing tasks on input data (e.g., voice, data), and stores the results. Subsequently, during RF timeslots 210C and 210E, respectively, RF front-end circuit 110 may perform RF operations on the stored results (for example, up-conversion) and transmit an RF signal.

It is noted that, depending on the specific protocol, architecture, and circuitry used, communication apparatus may receive and transmit simultaneously, as desired. More commonly, however, the system either transmits signals or receives signals during any one of RF time-slots 210A, 210C, 210E, etc. For example, a GSM-compliant system or apparatus, such as a mobile telephone that complies with the GSM specifications, either receives or transmits RF signals in one or more bursts of activity during each of RF time-slots 210A, 210C, 210E, etc.

It is further noted that the RF time-slots may have the same or different durations, as desired. RF time-slots may have unequal lengths so as to accommodate a wide variety of circuitry, systems, protocols, and specifications, as desired.

Similarly, the signal-processing time-slots may have similar or dissimilar durations, as desired. Each of signal-processing time-slots 210B, 210D, 210F, etc. may include several other time-slots or time divisions, depending on the particular communication protocol and/or signal-processing techniques and the particular circuitry and technology used. For example, a signal-processing time-slot may include several time-slots, with a portion or a particular circuit of digital processing circuit 120 actively processing signals during one or more of the time-slots.

To implement time domain isolation, digital processing circuit 120 may be placed in a shutdown mode of operation when an RF timeslot commences (i.e., when the radio is active). In one embodiment, during the shutdown mode of operation, a clock signal or signals within digital processing circuit 120 are disabled or inhibited. More specifically, by using static metal oxide semiconductor (MOS) circuitry, for example, the clock signal or signals within the digital processing circuit 120 may be shut down without losing data present within that circuitry. Accordingly, the digital processing circuit 120 can preserve the data within it while the RF front-end circuit 110 is active. Once the RF front-end circuit 110 has completed its reception or transmission (e.g., an RF timeslot has ended), the shutdown mode of digital processing circuit 120 may be discontinued by re-enabling the clock signal or signals. Digital processing operations on the data may then continue or commence. By disabling the clock or clocks in digital processing circuit 120 while RF front-end circuit 110 is active (i.e., receiving or transmitting), the amount of digital noise and thus spurious signals at the RF band of interest may be reduced, thus accommodating high performance.

It is noted that although FIG. 2 depicts the operation of the RF front-end circuit 110 and the digital processing circuit 120 as alternative events, these operations need not be mutually exclusive. Generally, it may be desirable to reduce or minimize the amount of overlap between the operation of the RF front-end circuit 110 and the digital processing circuit 120. Depending on a number of factors, however, the active operation of RF front-end circuit 110 and signal processing operations of digital processing circuit 120 may overlap to a certain extent.

It is also noted that in some alternative embodiments, the shutdown mode of digital processing circuit 120 may be implemented by causing at least portions of the circuitry to be held inactive or to be otherwise inhibited using other techniques (i.e., other than by disabling a clock signal(s)). For example, power may be removed from particular circuitry within digital processing circuit 120. Likewise, flip-flops or other circuits may be disabled (e.g., through an enable input). In addition, it is noted that some portions of the digital processing circuit 120, such as dynamic memory, may remain active during the shutdown mode (i.e., the circuitry of digital processing circuitry 120 may be partially powered down, disabled, or inhibited during the shutdown mode).

Figure 3:
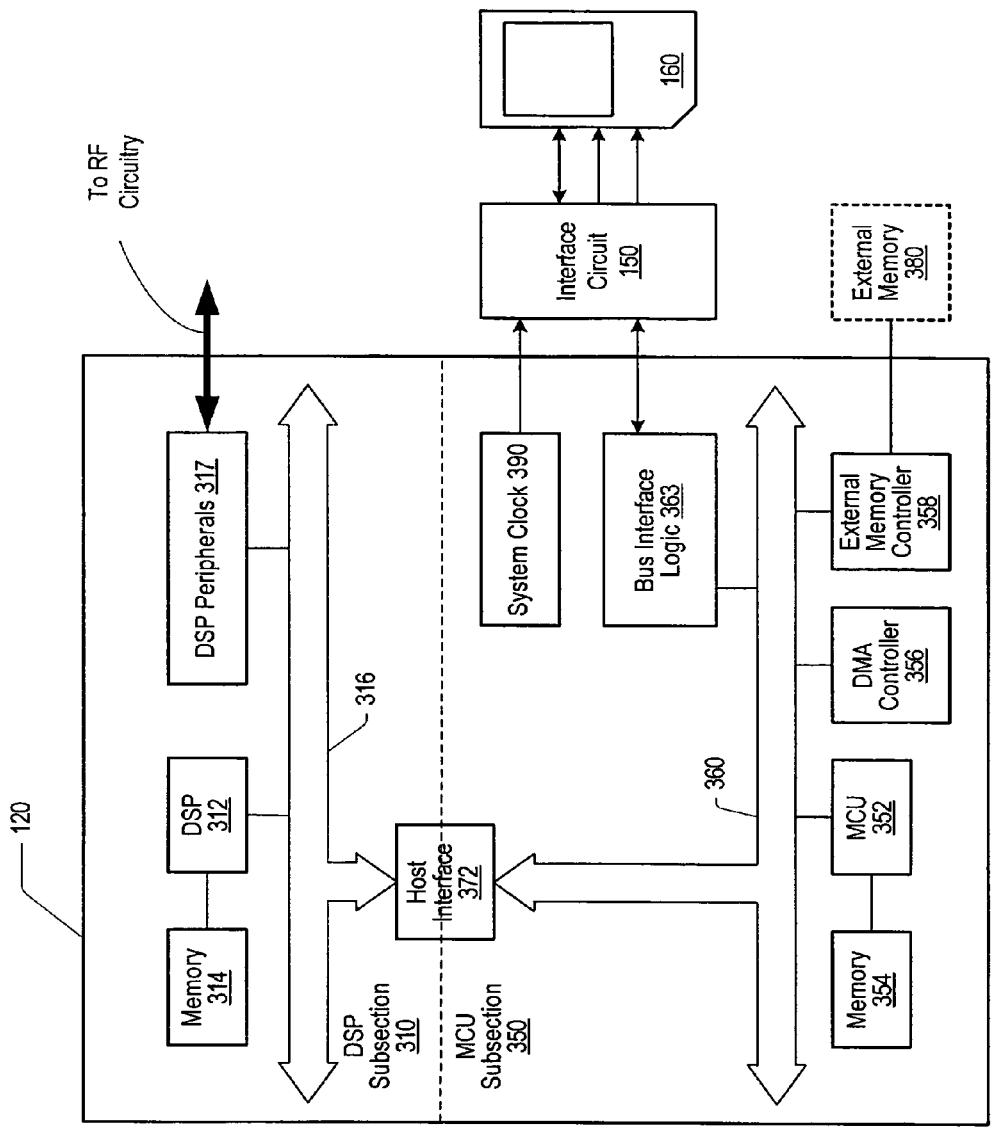
FIG. 3 illustrates a block diagram of an exemplary implementation of circuitry within a digital processing circuit.

FIG. 3 illustrates an exemplary implementation of circuitry within digital processing circuit 120. In this embodiment, digital processing circuit 120 includes a DSP subsection 310 and an MCU subsection 350, described below.

DSP subsection 310 may include a DSP core 312 coupled to an associated memory 314. Various DSP peripheral devices 317 may be coupled to DSP core 312 through one or more buses 316. In one embodiment, DSP peripherals 317 may include a hardware accelerator, an audio CODEC, a receive buffer, and a transmit buffer. It is noted that the specific number and types of peripheral devices provided within DSP subsection 310 may vary depending upon the application as well as the desired functionality and performance.

MCU subsection 350 may include an MCU core 352 coupled to an associated memory 354. Various peripherals including a DMA controller 356 and an external memory controller 358 are shown coupled to MCU 352 through one or more buses 360. A bus interface logic circuit 363 is further shown coupled to bus 360. In one embodiment, bus interface logic 363 may include a register interface, control logic for driving interface circuit 150, and an interrupt controller. Further details of the operation of bus interface logic 363 are provided below.

As shown, MCU subsection 350 may also include a system clock 390. In one embodiment system clock 390 is a fixed rate clock operating at a frequency of 26 MHz. System clock 390 may provide a clock signal to components within digital processing circuit 120 including MCU 352. In the illustrated embodiment, system clock 390 also provides a clock signal to interface circuit 150.

A host interface 372 is further shown for accommodating communications between DSP subsection 310 and MCU subsection 350. An external memory 380 is shown coupled to external memory controller 358. External memory 380 may comprise, for example, SRAM, flash, EEPROM, and/or other types of memory. It is noted that various additional external components (not shown in FIG. 3) may be coupled to digital processing circuit 120 including, for example, a keypad and a display. The configuration of FIG. 3 may embody a baseband circuit of, for example, a mobile telephone and/or modem. In one embodiment, digital processing circuit 120 implements both the GSM communication standard as well as the GPRS standard.

During operation, DSP subsection 310 may process data received from RF front-end circuit 110 through a receive buffer included among DSP peripherals 317. DSP subsection 310 may likewise provide processed data to a transmit buffer included among DSP peripherals 317, which is then conveyed to RF front-end circuit 110 through a digital-to-analog converter (DAC). Another DSP peripheral such as an audio CODEC may receive an audio signal from an external microphone or provide an audio signal to a speaker. In some implementations, other DSP peripherals such as a hardware accelerator may perform various low-level signal processing functions such as, for example, filtering, decimation, modulation, demodulation, coding, decoding, correlation and/or signal scaling, as desired.

MCU subsection 350, including programmable MCU 352, may be configured to perform a wide variety of functions using the modules within and externally connected to it. For example, in one implementation, MCU subsection 350 may provide functionality to support the communication protocol stack and various housekeeping tasks. In other embodiments, MCU subsection 350 is provided to perform higher-level processing functionality. For example, MCU subsection 350 may implement interfaces such as an MMI (man-machine-interface) and may provide an execution environment for applications running in the system. In addition, programmable MCU 352 may be configured to execute program instructions that comprise one or more software drivers that control peripheral devices such as interface circuit 150. It is noted that various alternative embodiments of MCU subsection 350 may be provided, depending upon the desired functionality. In one alternative embodiment, other peripherals may be coupled to bus 360 including a universal asynchronous receiver-transmitter (UART) and a keypad interface.

Various types of data may be communicated between MCU 352 and authentication device 160 via interface circuit 150, depending on the type of authentication device 160 and the desired functionality of communication apparatus 100. For example, in one embodiment, authentication device 160 is a smart card implementing an interface that complies with the ISO7816-3 standard. More specifically, authentication device 160 may be a subscriber identity module (SIM) further conforming to GSM standard 11.11. A SIM may store data such as phone numbers, subscriber identification data, and network authorization data. Information stored in a SIM may be retrieved and used by MCU 352 to perform a variety of tasks. Other features common to authentication device 160 generally and SIMs specifically may include transmission of general information such as manufacturer information, age information, and component identifiers to MCU 352. Interface circuit 150 may also exchange a sequence of data characters with authentication device 160 to detect the presence of authentication device 160, establish an operating voltage, and complete a reset sequence. Depending on the specific type of authentication device, program instructions available to MCU 352, and the desired functionality, a variety of data characters or sequences of data characters may be exchanged between interface circuit 150 and authentication device 160 to perform any number of alternative configuration, housekeeping, authentication, authorization, storage, and retrieval tasks.

Communication between MCU 352 and interface circuit 150 may be facilitated by bus interface logic 363. One or more registers within the register interface of bus interface logic 363 may be coupled directly to bus 360 and hold data passing between MCU 352 and interface circuit 150. Alternatively, in one embodiment, bus interface logic 363 may be coupled to DMA controller 356 to permit direct memory access between interface circuit 150 and memory 354. In one embodiment, a first register is configured to hold data for transmission to interface circuit 150 and a second register is configured to hold data received from interface circuit 150. In another embodiment, additional registers within bus interface logic 363 may be configured to hold data that is used in combination with control logic within bus interface logic 363 to configure the type, data rate, timing parameters, and direction of communication through interface circuit 150. In further embodiments, one or more additional registers within bus interface logic 363 may hold status data received from interface circuit 150. Also within bus interface logic 363, depending on the desired functionality, control logic may respond to this status data by signaling an interrupt controller, which in turn may deliver an interrupt signal to MCU 352.

Figure 4:
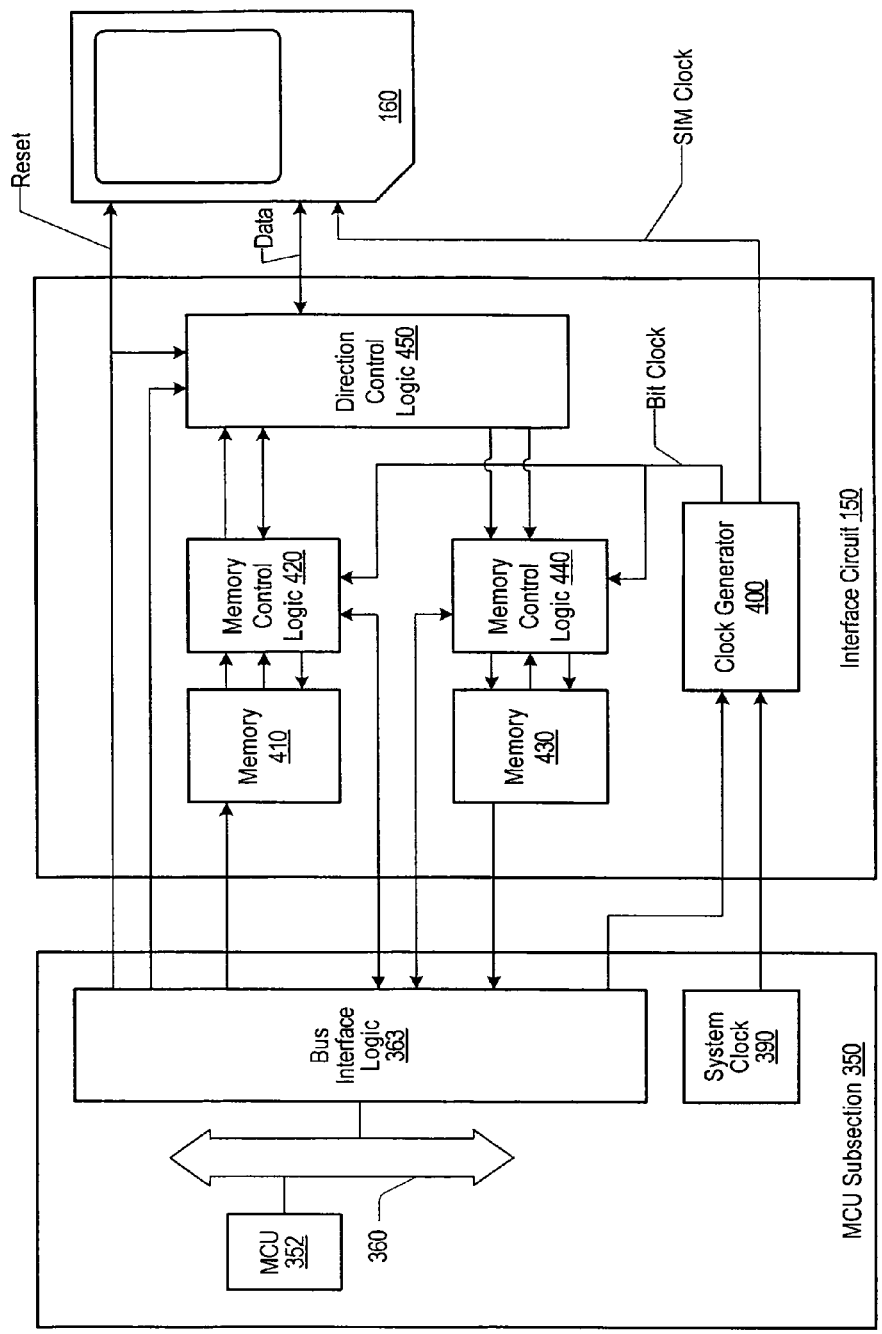
FIG. 4 illustrates a generalized block diagram of an interface circuit connected to an authentication device.

FIG. 4 is a block diagram illustrating one specific embodiment of interface circuit 150. In the illustrated embodiment, interface circuit 150 includes a transmit (Tx) memory 410, memory control logic 420, a receive (Rx) memory 430, and memory control logic 440. In one implementation, memory 410 is a first-in, first-out memory (FIFO) and memory 430 is a first-in, first-out memory (FIFO). Interface circuit 150 may also include a clock generator 400 and a direction control logic circuit 450. Various control parameters and signals may be conveyed from registers within bus interface logic 363 to interface circuit 150 or to authentication device 160 through interface circuit 150. For example, in the illustrated embodiment, interface circuit 150 may convey a reset signal unchanged from bus interface logic 363 to authentication device 160 to initiate a reset sequence.

Within interface circuit 150, in operation, data from MCU 352 may be buffered in memory 410 and subsequently, under the control of memory control logic 420, delivered to authentication device 160. In the reverse direction, data from authentication device 160 may be buffered in memory 430 under the control of memory control logic 440, and subsequently delivered to MCU 352. In accordance with the ISO7816-3 standard for smart cards, authentication device 160 may expect to receive a constant rate clock from interface circuit 150 during periods of active communication. Furthermore, according to ISO7816-3, communication with authentication device 160 may last for periods of up to several seconds without interruption depending on the number of data characters communicated and any wait intervals between transmission and reception. However, in accordance with the time domain isolation techniques discussed above, some embodiments of communication apparatus 100 may disable portions of digital processing circuit 120 during periods of RF activity, including MCU 352 and bus interface logic 363. These periods may overlap with periods of communication with authentication device 160.

Accordingly, in one embodiment, interface circuit 150 may remain active during periods of RF activity, maintaining communication with authentication device 160. In particular, interface circuit 150 contains a clock generator 400 that receives a constant rate clock signal from system clock 390 at, for example 26 MHz. Clock generator 400 may divide the rate of the system clock signal to produce a SIM clock at a rate that is compatible with the authentication device, for example a rate between 1 MHz and 4 MHz. Clock generator 400 may further divide the SIM clock rate by a fixed integer value to produce a bit clock to set the rate of data transmission to and from authentication device 160. For example, a default integer value for a SIM may be 372 SIM clock cycles per data bit. In one implementation, a set of partitioned counters within clock generator 400 may be clocked by system clock 390 and used to time the bit clock. Depending on the desired ratio of system clock to bit clock, one or more of the higher order partitions of these counters may be unnecessary for the counters to produce the desired ratio. If so, in one implementation, clock generator 400 may gate the clock driving the higher order partitions of these counters or otherwise disable the higher order partitions so as to reduce the amount of digital noise and thus spurious signals that may be picked up by RF front-end circuit 110. As shown in FIG. 4, clock generator 400 may deliver the bit clock to memory control logic 420 and memory control logic 440 for use in controlling the flow of data through memories 410 and 430.

As previously mentioned, interface circuit 150 may remain active during periods of RF activity, buffer data available for transmission to authentication device 160, and buffer data from authentication device 160. It may be desirable to reduce the amount of circuitry in interface circuit 150 and in particular the size of memory 410 and memory 430 in order to reduce the amount of digital noise and thus spurious signals that may be picked up by RF front-end circuit 110. In one implementation, the size of memory 410 is set to hold 80 characters, which may be sufficient to maintain a steady flow of data to authentication device 160 at a maximum data rate compatible with a SIM for a maximum expected duration of RF activity in a GSM-compatible mobile phone. The same calculated size may be applied to memory 430 for data flowing from authentication device 160. Other sizes of memories 410 and 430 are possible, depending on the communication protocol of authentication device 160, clock rates, desired functionality and performance, and tolerance to digital noise and thus spurious signals that may be picked up by RF front-end circuit 110.

In embodiments that are compatible with ISO7816-3, data is communicated to and from authentication device 160 via a uni-directional serial link. As shown, interface circuit 150 includes direction control logic 450 that may be configured to switch the coupling from authentication device 160 to either memory control logic 420 or memory control logic 440 depending on the type of communication desired. Specifically, in one embodiment, MCU 352 may transmit configuration data to direction control logic 450 via registers within bus interface logic 363 to place interface circuit 150 in one of 4 operating modes: idle, receive, transmit, and transmit-and-listen. In idle mode, direction control logic 450 may be configured to prevent data from being communicated between interface circuit 150 and authentication device 160. In receive mode, direction control logic 450 may be configured to allow data transmission from authentication device 160 to memory control logic 440 within interface circuit 150. In transmit mode, direction control logic 450 may be configured to allow data transmission from memory control logic 420 within interface circuit 150 to authentication device 160. In transmit-and-listen mode, direction control logic 450 may be configured to place interface circuit 150 in a transmit mode, wait for a signal from memory control logic 420 indicating the completion of a transmission, and responsively switch interface circuit 150 from a transmit mode to a receive mode. It is noted that once interface circuit 150 is configured in transmit-and-listen mode, switching from transmit mode to receive mode is enabled without requiring further signals from MCU 352, such as during periods of RF activity when MCU 352 may be disabled.

Additional control parameters may be sent from registers within bus interface logic 363 to memory control logic 420 and memory control logic 440. In one embodiment, a guard time parameter may be sent to indicate a minimum duration of time between the last bit of a transmitted character and the first bit of a following character, measured in bit clock cycles. In a further embodiment, a wait time parameter may be sent to indicate a maximum duration of time between the last bit of a transmitted character and the first bit of a following character, either transmitted or received in response, measured in bit clock cycles. In one implementation, a set of partitioned counters within memory control logic 420 and memory control logic 440 may be clocked by the bit clock and used to time the guard time and wait time. Depending on the specific configuration of guard time, wait time, and bit clock, one or more of the higher order partitions of these counters may be unnecessary for the counters to reach the configured values of guard time and/or wait time. If so, in one implementation, memory control logic 420 and memory control logic 440 may gate the clock driving the higher order partitions of these counters or otherwise disable the higher order partitions so as to reduce the amount of digital noise and thus spurious signals that may be picked up by RF front-end circuit 110.

Figure 5:
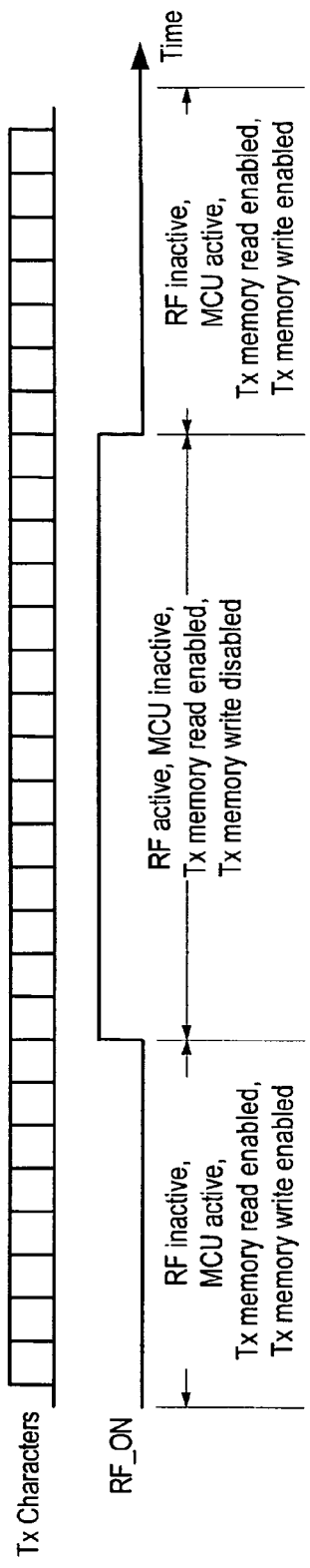
FIG. 5 illustrates a timing of the transmission of a sequence of data characters to an authentication device.

One of the previously described modes of operation of interface circuit 150 is the transmit mode. FIG. 5 illustrates a timing of the transmission of a sequence of data characters to authentication device 160. In the illustrated example, transmission begins during a period when RF front-end circuit 110 is inactive and MCU 352 is active. During this period, data may be written to and read from memory 410. As shown, transmission continues through a transition from RF inactivity to RF activity. MCU 352 may be disabled during this period of RF activity. Consequently, no data is written to memory 410 but data continues to be read from memory 410 and delivered to authentication device 160. Then, at the completion of the period of RF activity, MCU 352 may be re-enabled and data may again be written to and read from memory 410. It is noted that transmission of a sequence of data characters from MCU 352 may commence at any time when MCU 352 is active, and proceed with a duration that varies from one sequence to another, depending on the protocol, the content of the sequence, and the bit rate. Transmission of a sequence of characters at the bit rate may require a period of time that completes before, extends into, or extends through the next period or the next several periods of RF activity. In one embodiment, MCU 352 is programmed to transmit a burst of data to be buffered in memory 410 prior to a period of RF activity to ensure that authentication device 160 may continue to receive characters without interruption through a period of RF activity.

Figure 6:
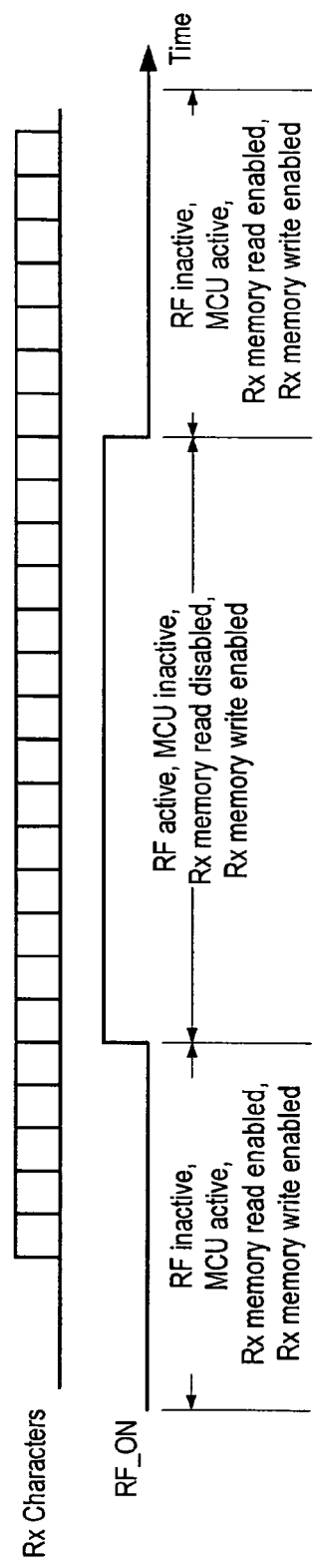
FIG. 6 illustrates a timing of the reception of a sequence of data characters from an authentication device.

Another previously described mode of operation of interface circuit 150 is the receive mode. FIG. 6 illustrates a timing of the reception of a sequence of data characters from authentication device 160. In the illustrated example, reception begins during a period when RF front-end circuit 110 is inactive and MCU 352 is active. During this period, data may be written to and read from memory 430. As shown, reception continues through a transition from RF inactivity to RF activity. MCU 352 may be disabled during this period of RF activity. Consequently, no data is read from memory 430 but data continues to be written to memory 430 from authentication device 160. Then, at the completion of the period of RF activity, MCU 352 may be re-enabled and data may again be written to and read from memory 430. It is noted that reception of a sequence of data characters by MCU 352 may commence at any time when MCU 352 is active. However, the duration of a transmission of a sequence of characters at the bit rate by authentication device 160 may vary from one sequence to another, depending on the protocol, the content of the sequence, and the bit rate. Consequently, such transmissions may require a period of time that completes before, extends into, begins during, or extends through the next period or the next several periods of RF activity. In one embodiment, MCU 352 is programmed to receive a burst of data that was buffered in memory 430 prior to a period of RF activity to ensure that authentication device 160 may continue to write characters into the memory through a period of RF activity without exceeding the memory's capacity. It is further noted that transmission from authentication device 160 may begin during a period of RF activity, in which case data may be written to memory 430 and buffered until the next time MCU 352 is enabled.

Figure 7:
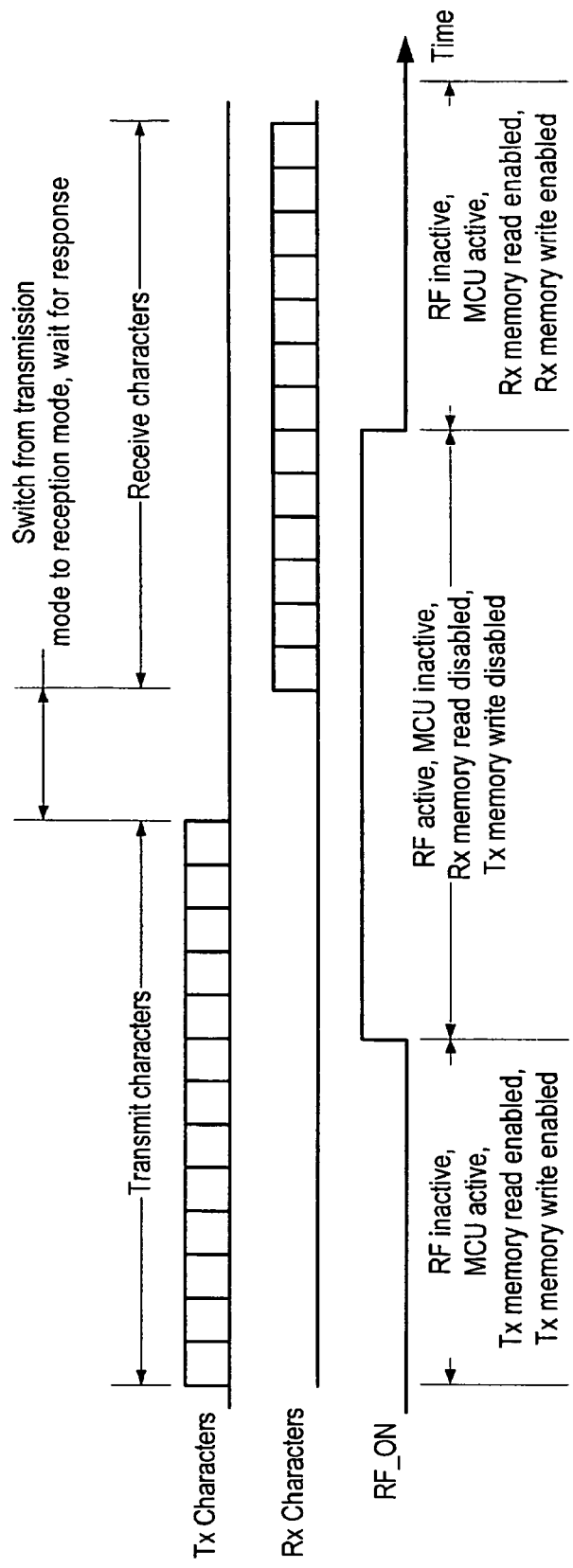
FIG. 7 illustrates a timing of the transmission, wait time, and reception of a sequence of data characters between an interface circuit and an authentication device.

A third operating mode of interface circuit 150, transmit-and-listen, was also described previously. FIG. 7 illustrates a timing of the transmission, wait time, and reception of a sequence of data characters between interface circuit 150 and authentication device 160. Initially, in this mode, a sequence of data characters may be transmitted from MCU 352 through memory 410 to authentication device 160. As illustrated, depending on the number of characters in the transmission and the bit rate, the transmission may complete during a period of RF activity. Following a configurable wait time a sequence of data characters may be received from authentication device 160 by memory 430 in response. It is noted that in the example shown, the transition from transmission to reception may occur within interface circuit 150 while MCU 352 is inactive. Specifically, if interface circuit 150 is configured in the transmit-and-listen mode, reception may commence prior to the transition from RF activity to RF inactivity. In one embodiment, memory 430 may be configured by memory control logic 440 to receive data from authentication device 160 but not transmit to MCU 352 during a period of RF activity. Once MCU activity resumes, memory control logic 440 may configure memory 430 to read and write data.

Figure 8:
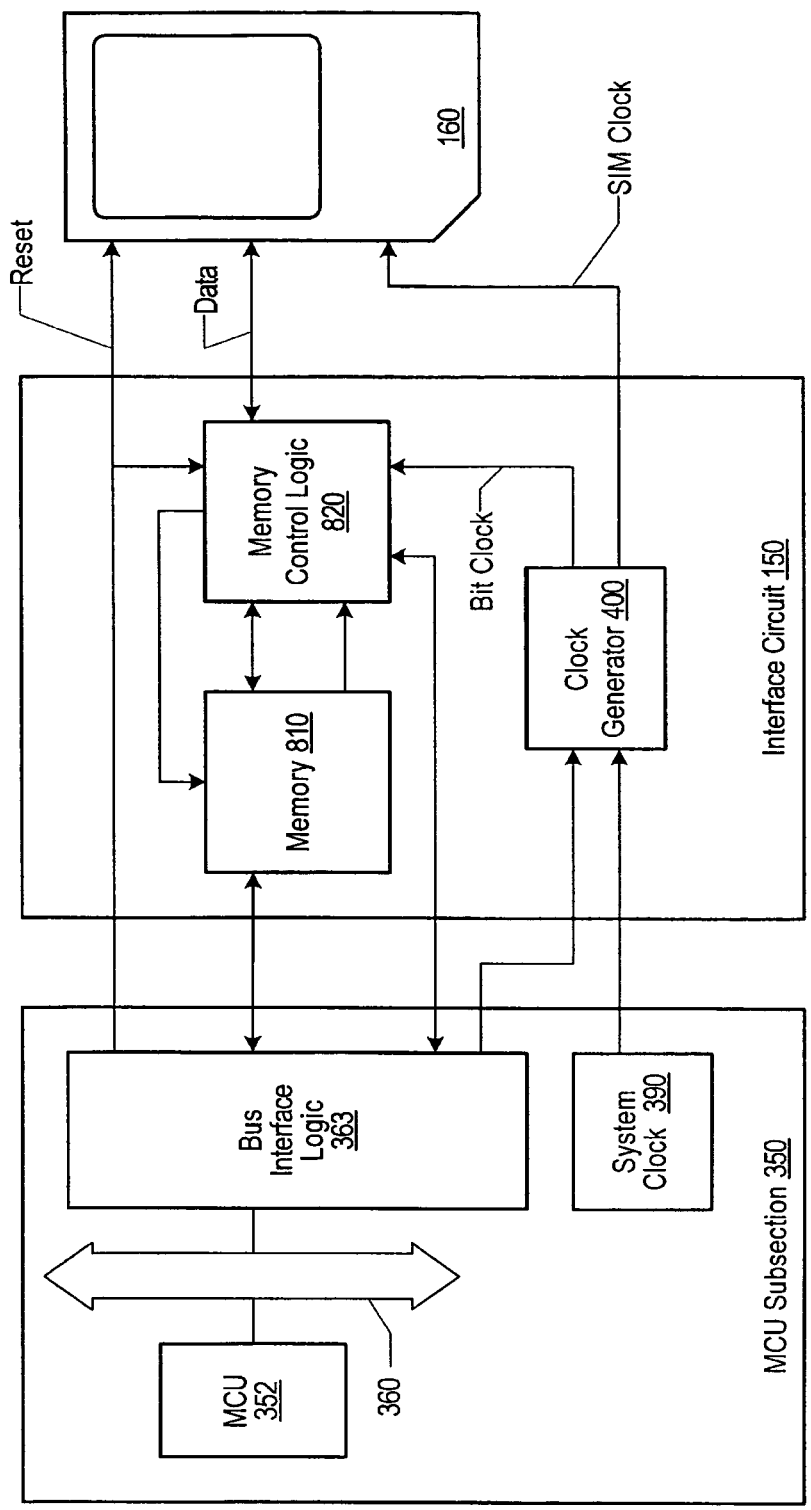
FIG. 8 illustrates a generalized block diagram of an alternative embodiment of an interface circuit connected to an authentication device.

FIG. 8 illustrates a generalized block diagram of an alternative embodiment of interface circuit 150. As previously mentioned, it is desirable to minimize the amount of circuitry in interface circuit 150 so as to reduce the amount of digital noise and thus spurious signals that may be picked up by RF front-end circuit 110. In the illustrated embodiment, a single memory 810 may be configured to buffer data from MCU 352 in a transmit mode of interface circuit 150 or buffer data from authentication device 160 in a receive mode of operation of interface circuit 150. Further reducing the circuitry of interface circuit 150, a single memory control logic circuit 820 may also be configured to control memory 810, embodying the four previously described modes of interface circuit 150: idle, transmit, receive, and transmit-and-listen. In one implementation, memory control logic 820 embodies the combined functionality of memory logic 420, memory logic 440, and direction control logic 450, as previously described. The illustrated embodiment maintains compatibility with specification of ISO7816-3 by providing a uni-directional data link to authentication device 160.

In a further embodiment, interface circuit 150 may be configured to buffer one or more sequences of data characters to be transmitted to authentication device 160 in response to one or more sequences of data characters of known length received from authentication device 160. Accordingly, during a period of RF activity (i.e., while MCU 352 is inactive), memory control logic circuit 820 may be configured to detect the reception of a known-length sequence of data characters while interface circuit 150 is in a receive mode, switch interface circuit 150 to a transmit mode, and transmit a sequence of data characters in response. Memory control logic circuit 820 may be further configured to repeat this process of switching between receive mode and transmit mode a number of times during a single period of RF activity, depending on the type of data characters to be received and transmitted, memory capacity, and clock rate, among other factors. It is noted that interface circuit 150 may be configured to switch between receive mode and transmit mode without requiring further signals from MCU 352.

In a still further embodiment, authentication device 160 may be configured to respond to the reception of a data character by transmitting a procedure byte. For example, a SIM may respond with one of four procedure bytes that encode one of the following: 1. NULL, indicating no response or command ignored, 2. ACK, indicating that the SIM has acknowledged the reception and will send a sequence of data characters in response, 3. /ACK, indicating that the SIM requires extra time for processing the request, but can accept one additional data character, and 4. COMPLETE, indicating that the SIM card has completed its response. During a period of RF activity, interface circuit 150 may be configured to receive the procedure bytes and respond accordingly. For example, if a procedure byte is received that corresponds to /ACK, interface circuit 150 may respond by transmitting one additional data character to authentication device 160. Alternatively, if a procedure byte is received that corresponds to ACK, interface circuit 150 may respond by transmitting a sequence of data characters to authentication device 160. It is noted that interface circuit 150 may be configured to respond to procedure bytes without requiring further signals from MCU 352, such as during periods of RF activity when MCU 352 may be disabled.

In an alternative further embodiment, memory 810 may be a first-in, first-out memory (FIFO). In this embodiment, memory control logic 820 may be configured to clock memory 810 in transmission or reception. During periods when MCU 352 is active and memory 810 is configured to receive data from authentication device 160, MCU 352 may write data to memory 810, corrupting the contents of the FIFO. Memory control logic 820 may be configured to detect data corruption by monitoring the count of the number of bits remaining in the FIFO, the configured direction of the FIFO, and the presence of a write signal from MCU 352. Memory control logic 820 may then send a signal back to MCU 352 indicating that data coming from authentication device 160 has been corrupted, thereby permitting MCU 352 to take corrective action. Similarly, during periods when MCU 352 is active and memory 810 is configured to transmit data to authentication device 160, MCU 352 may read data from memory 810, corrupting the sequence of data available to authentication device 160. Memory control logic 820 may be configured to detect this data corruption by monitoring the count of the number of bits remaining in the FIFO, the configured direction of the FIFO, and the presence of a read signal from MCU 352. Memory control logic 820 may then send a signal back to MCU 352 indicating that data available for transmission to authentication device 160 has been corrupted, thereby permitting MCU 352 to take corrective action.

Other implementations of interface circuit 150 and its connections to digital processing circuit 120 are possible in alternative embodiments. For example, memories 410, 430, and 810 may be connected directly to MCU 352, or to an alternative embodiment of a processing unit within digital processing circuit 120. Also, memories 410, 430, and 810 may comprise, for example, SRAM, flash, and/or other types of memory. In addition, portions of bus interface logic 363 may be incorporated into interface circuit 150, depending on the desired functionality, performance, and tolerance to digital noise and thus spurious signals that may be picked up by RF front-end circuit 110.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A communication apparatus comprising:
 a radio frequency (RF) circuit configured to operate on a radio frequency signal;
 a digital processing circuit coupled to the RF circuit, wherein at least a portion of the digital processing circuit is disabled during an active mode of operation of the RF circuit ; and
 an interface circuit configured to buffer data communicated between the digital processing circuit and an authentication device during the active mode of operation of the RF circuit, in a first mode of operation, to buffer data available for transmission to the authentication device, and in a second mode of operation, to buffer data received from the authentication device wherein a count of a number of bytes of data buffered is maintained and responsive to the count being greater than zero a signal is generated indicating that the buffered data contains erroneous data following a read or a write operation.

2. The communication apparatus as recited in claim 1, wherein at least a portion of the digital processing circuit includes a processing unit configured to process authentication data received from the authentication device.

3. The communication apparatus as recited in claim 2, wherein the processing unit is a microcontroller unit (MCU).

4. The communication apparatus as recited in claim 1, wherein the authentication device is a subscriber identity module (SIM).

5. The communication apparatus as recited in claim 1, wherein the interface circuit includes a memory and memory control logic,
 wherein in the first mode of operation, the memory is configured by the memory control logic to buffer data available for transmission to the authentication device, and
 wherein in the second mode of operation, the memory is configured by the memory control logic to buffer data received from the authentication device.

6. The communication apparatus as recited in claim 5, wherein the interface circuit is configured to switch from the second mode of operation to the first mode of operation and to transmit a portion of the data available for transmission to the authentication device in response to a reception of data from the authentication device indicating readiness to receive additional data.

7. The communication apparatus as recited in claim 1, wherein the interface circuit includes a memory logic circuit and wherein the interface circuit is configured to switch from the first mode of operation to the second mode of operation in response to a signal from the memory control logic indicating that a transmission has been completed during an active mode of operation of the RF circuit.

8. The communication apparatus as recited in claim 1, wherein the interface circuit includes a memory logic circuit and wherein the interface circuit is configured to switch from the second mode of operation to the first mode of operation in response to a signal from the memory control logic circuit indicating that a reception has been completed during an active mode of operation of the RF circuit.

9. The communication apparatus as recited in claim 1, wherein the interface circuit includes:
a first memory configured to buffer data available for transmission to the authentication device;
a first memory control logic circuit;
a second memory configured to buffer data received from the authentication device during an active mode of operation of the RF circuit; and
a second memory control logic circuit.

10. The communication apparatus as recited in claim 9, wherein the first memory is a first-in, first-out memory (FIFO) and the second memory is a first-in, first-out memory (FIFO).

11. The communication apparatus as recited in claim 9, wherein the interface circuit is configured to switch from transmission to reception in response to a signal from the first memory control logic circuit indicating that a transmission has been completed during an active mode of operation of the RF circuit.

12. The communication apparatus as recited in claim 1, wherein the interface circuit is configured to start transmitting data to the authentication device during an inactive mode of operation of the RF circuit and continue to transmit without interruption while the RF circuit transitions to an active mode of operation.

13. The communication apparatus as recited in claim 1, wherein the interface circuit is configured to start receiving data from the authentication device during an inactive mode of operation of the RF circuit and continue to receive without interruption while the RF circuit transitions to an active mode of operation.

14. The communication apparatus as recited in claim 1, wherein at least a portion of the interface circuit is clocked at a frequency that is less than a frequency at which the digital processing circuit is clocked.

15. A method of operating a communication apparatus including a radio frequency (RF) circuit, a digital processing circuit, and an interface circuit configured to communicate with an authentication device, the method comprising:
operating the digital processing circuit during an inactive mode of operation of the RF circuit;
disabling at least a portion of the digital processing circuit during an active mode of operation of the RF circuit in order to minimize noise and interference between the digital processing circuit and an RF front end circuit; and
buffering data within the interface circuit for communication between the digital processing circuit and the authentication device during the active mode of operation of the RF circuit, and, in a first mode of operation, the interface circuit buffers data available for transmission to the authentication device and, in a second mode of operation, the interface circuit buffers data received from the authentication device wherein a count of a number of bytes of data buffered is maintained and responsive to the count being greater than zero a signal is generated indicating that the buffered data contains erroneous data following a read or a write operation.

16. The method as recited in claim 15, wherein the at least a portion of the digital processing circuit includes a processing unit configured to process authentication data received from the authentication device.

17. The method as recited in claim 15, further comprising buffering data available for transmission to the authentication device in a memory.

18. The method as recited in claim 17, wherein the memory is a first-in, first-out memory (FIFO).

19. The method as recited in claim 18, further comprising:
transmitting data to the authentication device;
detecting that the digital processing circuit has performed the read operation on the FIFO; and
responsively generating a signal indicating that the contents of the FIFO contain erroneous data if the count of the number of bytes of data buffered was greater than zero.

20. The method as recited in claim 15, further comprising buffering data received from the authentication device in a memory during an active mode of operation of the RF circuit.

21. The method as recited in claim 20, wherein the memory is a first-in, first-out memory (FIFO).

22. The method as recited in claim 21, further comprising:
detecting that the digital processing circuit has performed the write operation on the FIFO; and
responsively generating a signal indicating that the contents of the FIFO contain erroneous data if the count of the number of bytes of data buffered was greater than zero.

23. The method as recited in claim 15, further comprising:
buffering data available for transmission to the authentication device;
transmitting data to the authentication device;
switching the interface circuit from a transmission mode of operation to a reception mode of operation in response to a signal indicating that the number of bytes of data buffered is zero during an active mode of operation of the RF circuit;
receiving data from the authentication device; and
buffering data received from the authentication device.

24. A mobile phone comprising:
a radio frequency (RF) transceiver configured to operate on a radio frequency signal;
a digital processing circuit coupled to the RF transceiver; and
an interface circuit configured to buffer data communicated between the digital processing circuit and a secure storage device during an active mode of operation of the RF transceiver and the interface circuit configured, in a first mode of operation, to buffer data available for transmission to the authentication device and, in a second mode of operation, to buffer data received from the authentication device wherein a count of a number of bytes of data buffered is maintained and responsive to the count being greater than zero a signal is generated indicating that the buffered data contains erroneous data following a read or a write operation on a buffer,
wherein the digital processing circuit comprises a processing unit configured to process authentication data received from the secure storage device,
wherein the processing unit is disabled during the active mode of operation of the RF transceiver to reduce noise and interference, and
wherein the RF transceiver, the digital processing circuit, and the interface circuit are fabricated on a single integrated circuit chip.

* * * * *